United States Patent
Sims

(10) Patent No.: US 9,187,065 B1
(45) Date of Patent: Nov. 17, 2015

(54) HEATED WINDSHIELD WIPER ASSEMBLY

(71) Applicant: Joe W. Sims, Maple Heights, OH (US)

(72) Inventor: Joe W. Sims, Maple Heights, OH (US)

( * ) Notice: Subject to any disclaimer, the term of this patent is extended or adjusted under 35 U.S.C. 154(b) by 289 days.

(21) Appl. No.: 13/914,814

(22) Filed: Jun. 11, 2013

(51) Int. Cl.
*B60S 1/38* (2006.01)
*B60S 1/54* (2006.01)

(52) U.S. Cl.
CPC ............... *B60S 1/3803* (2013.01); *B60S 1/546* (2013.01); *B60S 1/54* (2013.01)

(58) Field of Classification Search
CPC ........... B60S 1/54–1/548; B60S 1/048; B60S 1/3803
USPC .......................................... 15/250.04–250.07
See application file for complete search history.

(56) References Cited

U.S. PATENT DOCUMENTS

| | | | |
|---|---|---|---|
| 1,755,059 A * | 4/1930 | Gallagher, Jr. ............. | 15/250.04 |
| 1,798,018 A * | 3/1931 | Gallagher, Jr. ............. | 15/250.07 |
| 1,857,042 A * | 5/1932 | Colley .......................... | 15/250.04 |
| 1,946,009 A * | 2/1934 | Besson ........................ | 15/250.04 |
| 2,562,302 A * | 7/1951 | Downey ....................... | 15/250.04 |
| 2,639,455 A * | 5/1953 | Schwarzmann ............ | 15/250.04 |
| 2,648,865 A * | 8/1953 | Gordon et al. ............. | 15/250.04 |
| 3,321,792 A * | 5/1967 | Senkewich .................. | 15/250.04 |
| 4,360,941 A | 11/1982 | Mabie | |
| 5,650,080 A | 7/1997 | Koneke | |
| 6,008,474 A * | 12/1999 | Dumas .......................... | 219/203 |
| 6,049,939 A * | 4/2000 | Rutkoske .................... | 15/250.04 |
| 6,236,019 B1 | 5/2001 | Piccione et al. | |
| 6,954,965 B1 * | 10/2005 | Jacobson et al. ........... | 15/250.04 |
| 2005/0229351 A1 * | 10/2005 | McMullen ................. | 15/250.04 |

* cited by examiner

*Primary Examiner* — Mark Spisich
*Assistant Examiner* — Andrew A Horton
(74) *Attorney, Agent, or Firm* — Crossley Patent Law

(57) ABSTRACT

A heated windshield wiper assembly which employs heated forced air generated by a heater-blower powered by a cigarette lighter accessory that flows therefrom through conduits attached to each wiper arm that, in turn, are attached to inlet ports on the blade housing disposed at the outer end of the wiper arms. Each blade housing has an air chamber, fluidly connected to the inlet port, with a pocket on each side of the wiper blade therein to keep both the blade housing and wiper blade warm and a plurality of outlets on a bottom side of the blade housing through which the heated air flow generated by the heater-blower also exits onto the wiper blade and onto the windshield.

3 Claims, 6 Drawing Sheets

HEATED WINDSHIELD WIPER ASSEMBLY

BACKGROUND OF THE INVENTION

Various types of heated windshield wipers are known in the prior art, which include inductively heated windshield wiper assemblies, but do not employ heated forced air as a source of heat for preventing the accumulation of ice and snow on a blade housing and the windshield wiper blade. The present heated windshield wiper assembly employs heated forced air generated by a heater-blower powered by a cigarette lighter accessory that flows therefrom through conduits attached to each wiper arm that, in turn, are attached to inlet ports on the blade housing disposed at the outer end of the wiper arms. Each blade housing has an air chamber, fluidly connected to the inlet port, having a pocket on each side of the wiper blade therein to keep both the blade housing and wiper blade warm and a plurality of outlets on a bottom side of the blade housing through which the heated air flow generated by the heater-blower also exits onto the wiper blade and onto the windshield.

FIELD OF THE INVENTION

The present invention relates to windshield wipers, and more particularly, to a heated windshield wiper assembly which employs heated forced air to prevent the accumulation of ice and snow on a wiper blade.

SUMMARY OF THE INVENTION

The general purpose of the present heated windshield wiper assembly, described subsequently in greater detail, is to provide a heated windshield wiper assembly which has many novel features that result in a heated windshield wiper assembly which is not anticipated, rendered obvious, suggested, or even implied by prior art, either alone or in combination thereof.

To accomplish this, the present heated windshield wiper assembly employs heated air flow generated by a heater-blower to prevent the accumulation of ice and snow on a blade housing on an outer end of each front windshield wiper arm and wiper blade disposed thereon as well as on the front windshield of a vehicle or truck. The heater-blower has a pair of grooves disposed circumferentially therearound that is designed to retain a tie band to mount the heater-blower to an underside of a vehicle hood or onto the lower bracket of the truck driver side mirror. The heater unit also includes a conduit provided to conduct heated air flow and a power source for the heater-blower. The conduit has a first end attached to the top end and second end divided into a first wiper conduit and a second wiper conduit. Each of the first wiper conduit and the second wiper conduit is attached to an arm of one of the front windshield wipers. A cigarette lighter plug that is in operational communication with a cigarette lighter socket, a main battery of an automobile, and a dedicated battery are examples of the power source.

A hollow casing is disposed on a top side of each blade housing. An air inlet port is disposed on the casing. Each of the first wiper conduit and the second wiper conduit is attached to a respective one of the air inlet ports. An air chamber fluidly connected to the air inlet port is continuously disposed within the blade housing. The air chamber includes a pocket disposed on each side of a wiper blade attached to the blade housing to surround the wiper blade with warm air flow to prevent accumulating ice and snow on the wiper blade. A plurality of outlets fluidly connected to the air chamber is provided. The outlets are disposed within an entire length of each blade housing between each side of the wiper blade and the respective pocket. The forced heat air flow generated by the heater-blower flows from the heater-blower into the conduit first end, then out of each of the first wiper conduit and the second wiper conduit into the air inlet port, from the air inlet port into the air chamber and then out of each of the outlets onto the wiper blade as well as onto the front windshield to keep the wiper blade and front windshield free from the accumulation of ice and snow on the wiper blade and front windshield.

A hollow waterproof receptacle is removably disposed on the right side wall of each blade housing so that water from rain or melted ice or snow can be trapped therein and then drained therefrom, thus preventing the accumulation of ice and snow on the blade housing and wiper blade.

An attachment body that attaches the blade housing to a front windshield wiper arm is disposed on each blade housing proximal the front wall of the blade housing. The attachment body has an inner side and an outer side. A clip is provided that has a rearward end centrally attached to the casing front side and the forward end centrally attached to the attachment body inner side. The arm of each front windshield wiper blade is attached to the attachment body outer side.

Thus has been broadly outlined the more important features of the present heated windshield wiper assembly so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
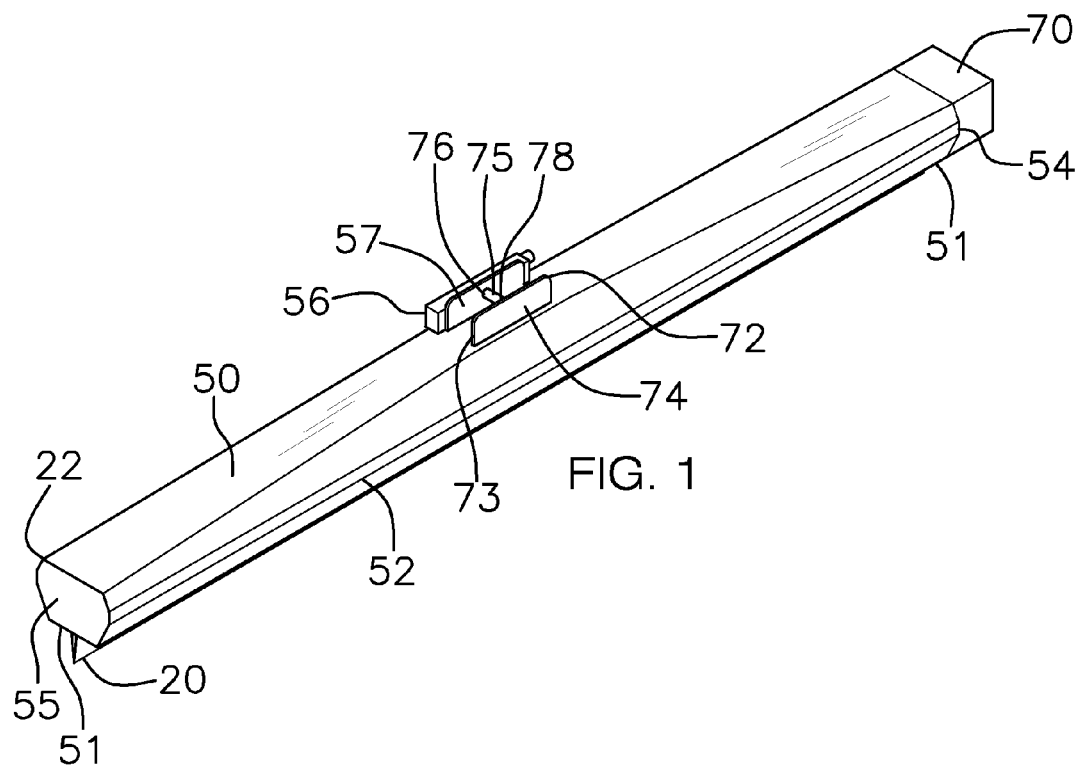
FIG. 1 is an isometric view of a blade housing.
Figure 2:
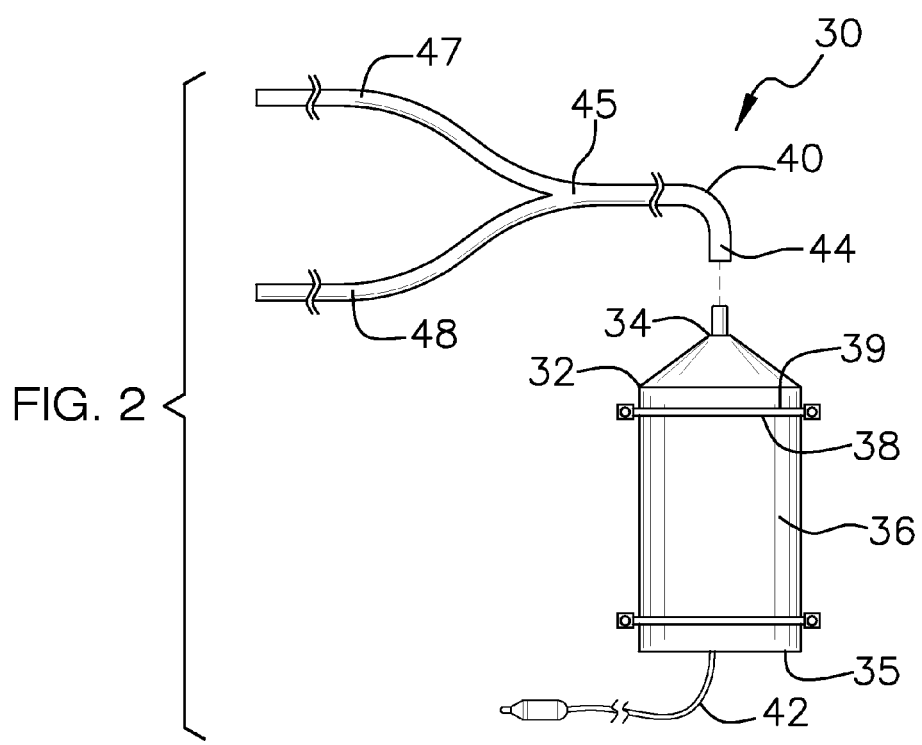
FIG. 2 is a side elevation view of a heater unit.
Figure 3:
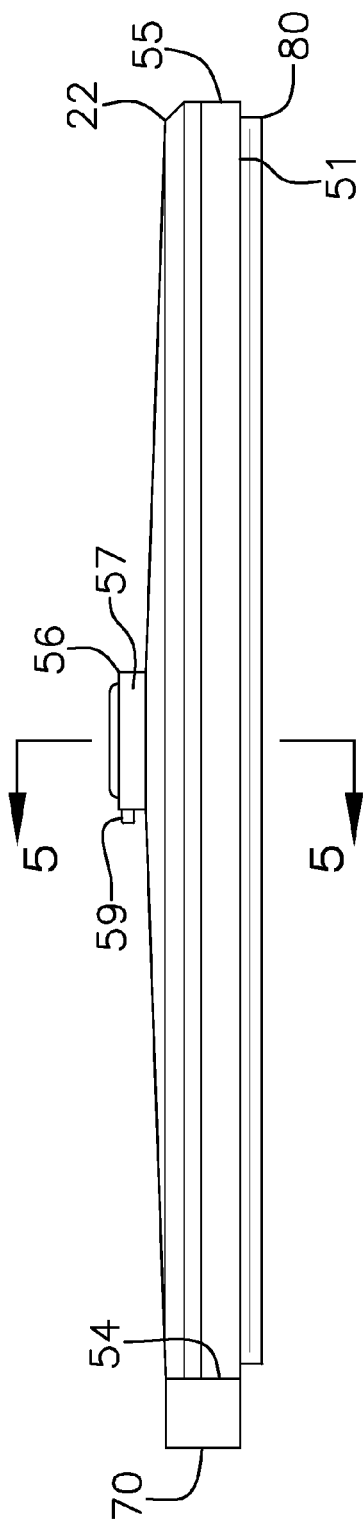
FIG. 3 is a side elevation view of the blade housing.
Figure 4:
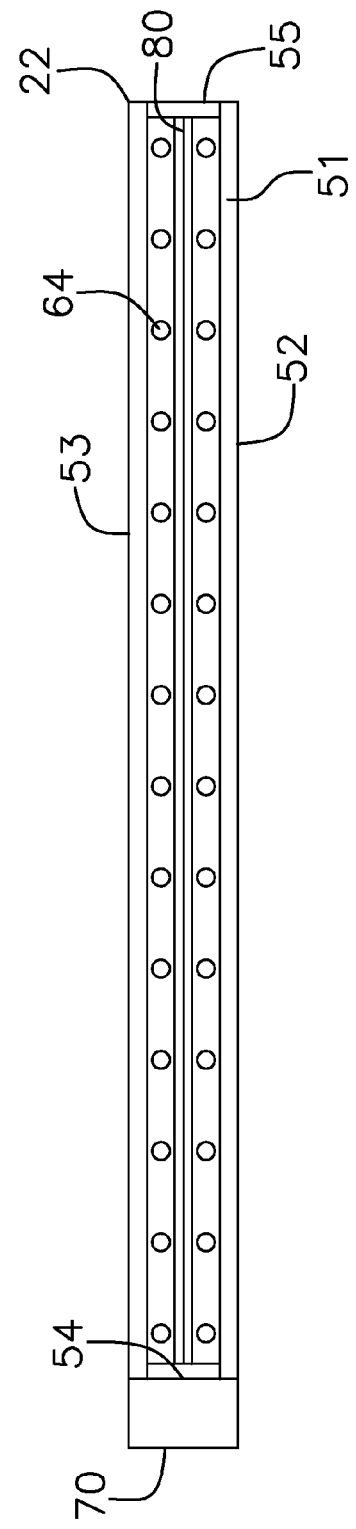
FIG. 4 is a rear elevation view of the blade housing.
Figure 5:
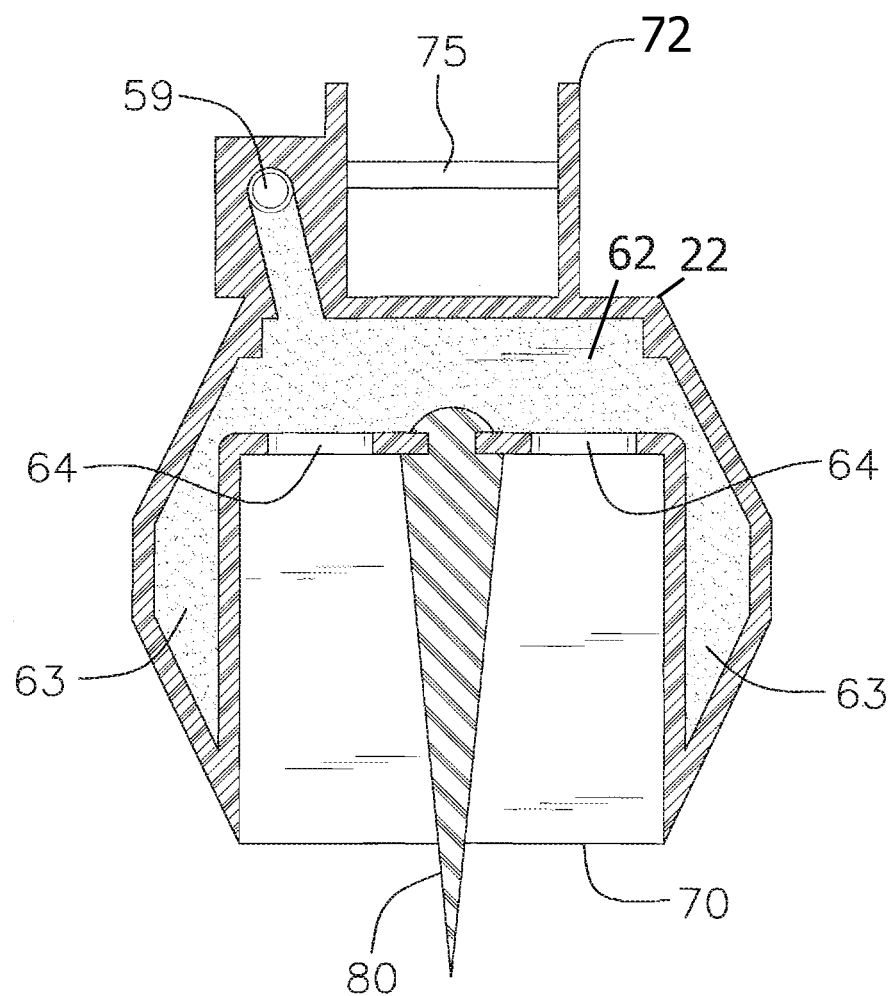
FIG. 5 is a cross-sectional view taken along line 5-5 of FIG. 3.
Figure 6:
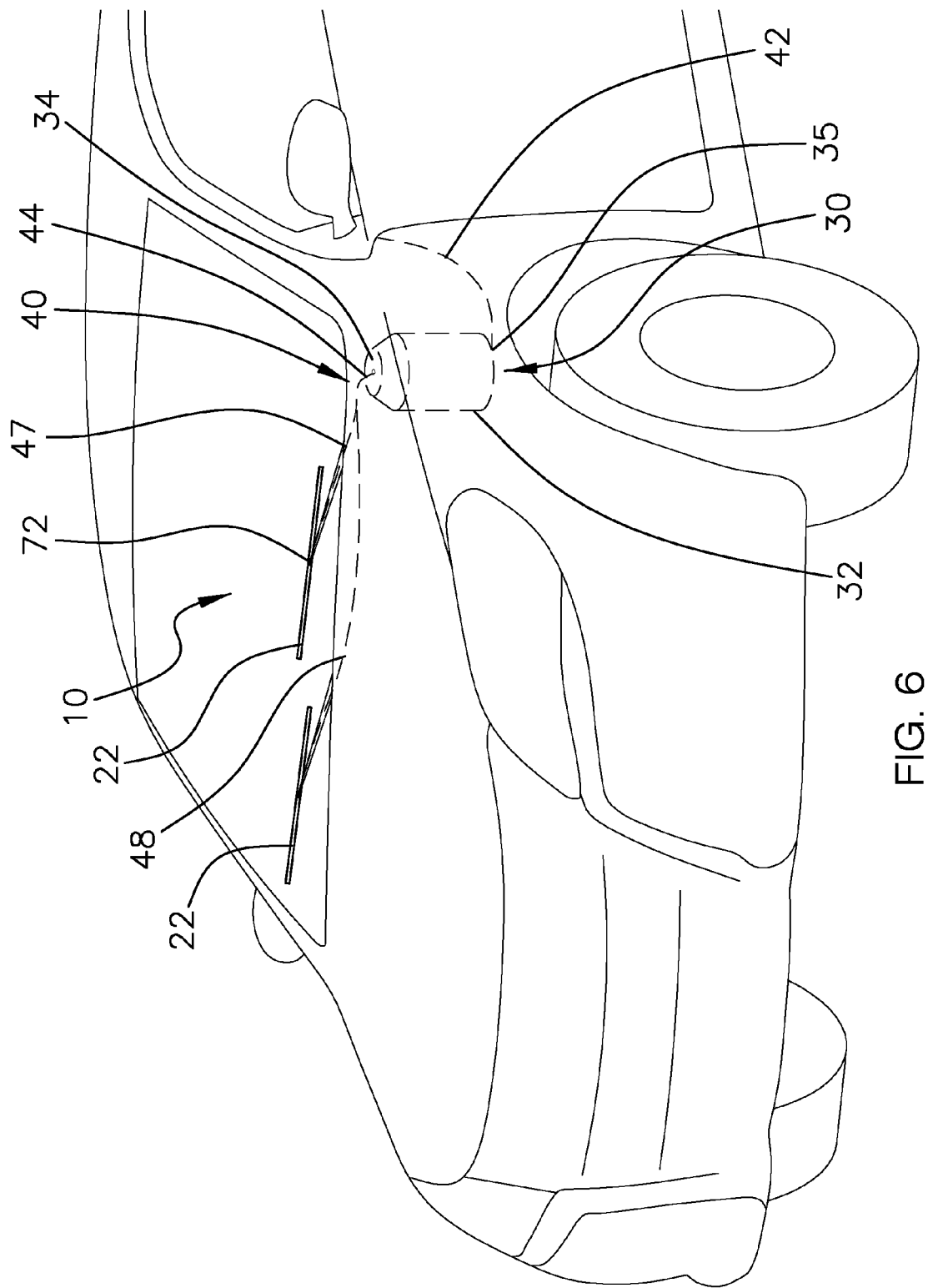
FIG. 6 is an in-use view of the present device.
Figure 7:
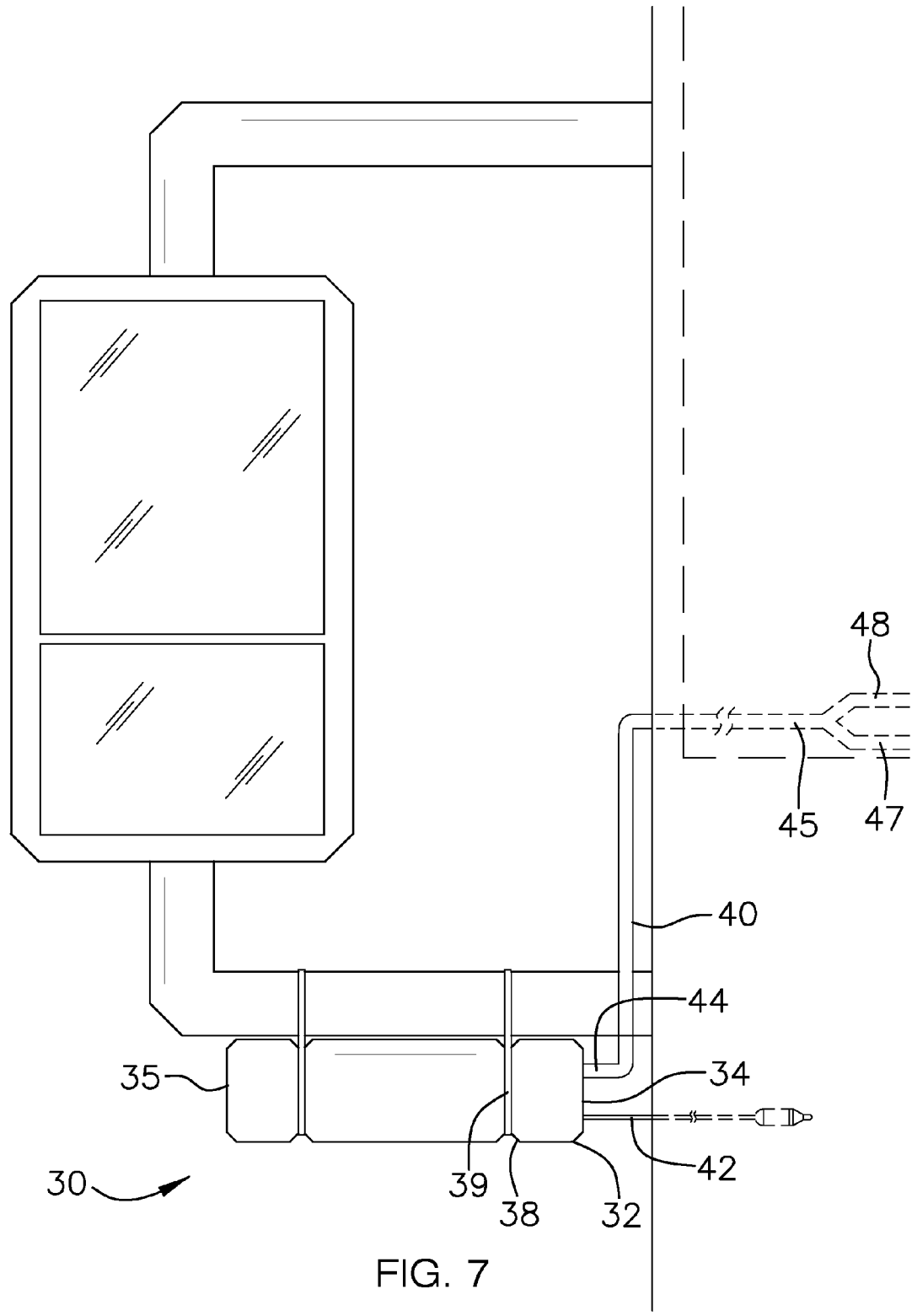
FIG. 7 is an in-use view showing how the heater unit is attached to a lower bracket of a truck driver side mirror that is a dual mount mirror.
Figure 8:
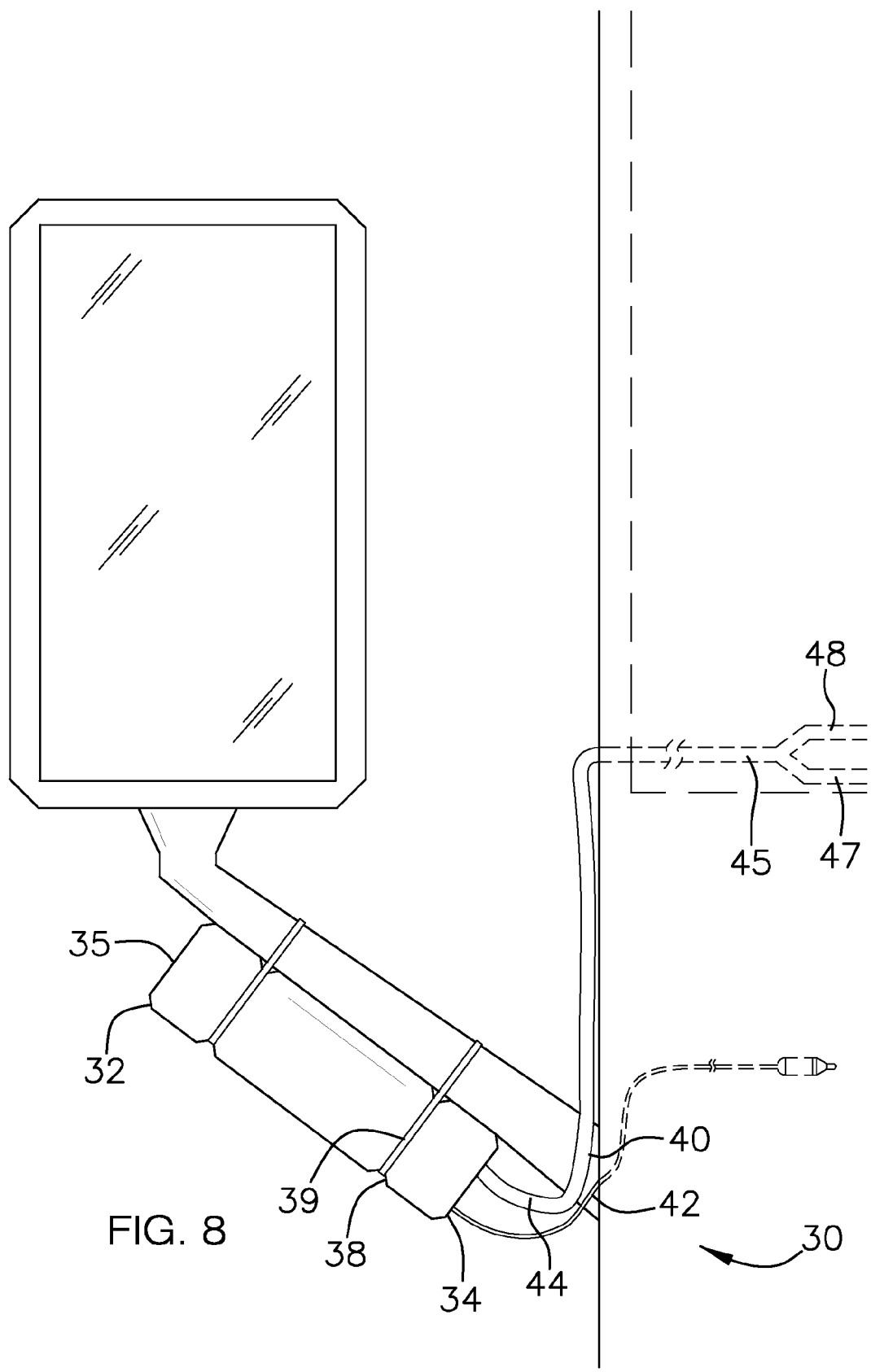
FIG. 8 is an in-use view showing how the heater unit is attached to a lower bracket of a truck driver side mirror that is a single mount mirror.

With reference now to the drawings, and in particular FIGS. 1 through 8 thereof, an example of the instant heated windshield wiper employing the principles and concepts of the present heated windshield wiper assembly and generally designated by the reference number 10 will be described.

Referring to FIGS. 1 through 8, the present heated windshield wiper assembly 10 to prevent the accumulation of ice and snow on a front windshield wiper blade 20 and blade housing 22 as well as on the front windshield of a vehicle or truck is illustrated. The heated windshield wiper assembly 10 includes a heater unit 30. The heater unit 30 includes a motorized heater-blower 32 having a top end 34 and a bottom end 35 that is mounted to an underside of a vehicle hood in proximity to one of a front windshield wiper or alternately to a lower bracket of a truck driver side mirror which is either a single mount mirror or dual mount mirror. The heater-blower 30 generates forced heat air flow. The heater-blower 30 has a cylindrical outer wall 36 continuously disposed between the top end 34 and the bottom end 35. A pair of spaced apart grooves 38 is disposed circumferentially around the outer wall 36. Each of the grooves 38 is configured to retain a tie band 39 to mount the heater-blower to an underside of a vehicle hood or onto the lower bracket of the truck driver side mirror.

The heater unit 30 also includes a conduit 40 and a power source 42 for the heater-blower 32. The conduit 40 has a first end 44 attached to the top end 34 and second end 45 divided into a first wiper conduit 47 and a second wiper conduit 48. Each of the first wiper conduit 47 and the second wiper conduit 48 is attached to an arm of one of the front windshield wipers. When the heater-blower 32 is mounted to an underside of a vehicle hood, the power source 42 is attached to the bottom end 35 of the heater-blower 32. However, when the heater-blower is attached to a lower bracket of a truck driver side mirror, the power source 42 is attached to the top end 34 proximal the first end 44 of the conduit 40. A cigarette lighter plug that is in operational communication with a cigarette lighter socket, a main battery of an automobile, and a dedicated battery are examples of the power source.

The blade housing 22 is disposed on an outer end of each front windshield wiper arm. Each blade housing 22 has a top side 50, a bottom side 51, a front wall 52, a rear wall 53, a right side wall 54 and a left side wall 55. A hollow casing 56 is disposed on a top side 50 of each blade housing 22. The casing 56 has a front side 57 and a rear side 58. An air inlet port 59 is disposed on the casing 56. Each of the first wiper conduit 47 and the second wiper conduit 48 is attached to a respective one of the air inlet ports 59.

An air chamber 62 fluidly connected to the air inlet port 59 is continuously disposed within the blade housing 22. The air chamber 62 includes a pair of pockets 63. One of the pockets 63 is disposed on each side of a wiper blade 80 attached to the blade housing 22 to surround the wiper blade 80 with warm air flow to prevent accumulating ice and snow on the wiper blade 80. A plurality of spaced apart pair of outlets 64 is fluidly connected to the air chamber 62. The outlets 64 are disposed within an entire length each blade housing between each side of the wiper blade 80 and the respective pocket 63. The forced heat air flow generated by the heater-blower 32 flows from the heater-blower 32 into the conduit 40 first end 44, then out of each of the first wiper conduit 47 and the second wiper conduit 48 into the air inlet port 59, from the air inlet port 59 into the air chamber 62 and then out of each of the outlets 64 onto the wiper blade 80 as well as onto the front windshield to keep the wiper blade 80 and front windshield free from the accumulation of ice and snow on the wiper blade 80 and front windshield.

A hollow waterproof receptacle 70 is removably disposed on the right side wall 54 of each blade housing 22 so that water from rain or melted ice or snow can be trapped therein and then drained therefrom, thus preventing the accumulation of ice and snow on the blade housing 22 and wiper blade 80.

An attachment body 72 that attaches the blade housing 22 to a front windshield wiper arm is disposed on each blade housing 33 proximal the front wall 52 of the blade housing 22. The attachment body 72 has an inner side 73 and an outer side 74. A clip 75 is provided that has a rearward end 76 centrally attached to the casing 56 front side 57 and the forward end 78 centrally attached to the attachment body 72 inner side 73. The arm of each front windshield wiper blade is attached to the attachment body 72 outer side 74.

What is claimed is:

1. A heated windshield wiper assembly comprising:
   a heater unit including:
      a motorized heater-blower mounted to a lower bracket of a truck driver side mirror, the heater-blower having a top end and a bottom end;
      a conduit having a first end attached to the top end and a second end divided into a first wiper conduit and a second wiper conduit, each of the first wiper conduit and the second wiper conduit attached to an arm of one of a plurality of front windshield wipers;
      a power source attached to the top end proximal the first end of the conduit, the power source in operational communication with the heater-blower;
      wherein the heater-blower is configured to generate forced heat air flow;
   a blade housing disposed on an outer end of each arm, each blade housing having a top side, a bottom side, a front wall, a rear wall, a right side wall, and a left side wall;
   a hollow casing disposed on the top side of each blade housing, the casing having a front side and a rear side;
   an air inlet port disposed on the casing, wherein each of the first wiper conduit and the second wiper conduit is attached to a respective one of the air inlet ports;
   an air chamber continuously disposed within the blade housing, wherein the air chamber is fluidly connected to the air inlet port;
   a pair of pockets of the air chamber, one of the pockets disposed on each side of a wiper blade attached to the blade housing;
   a plurality of spaced apart pairs of outlets fluidly connected to the air chamber, the outlets disposed within an entire length each blade housing between each side of the wiper blade and the respective pocket;
   wherein the forced heat air flow generated by the heater-blower flows from the heater-blower into the conduit first end, then out of each of the first wiper conduit and the second wiper conduit into the air inlet port, from the air inlet port into the air chamber and then out of each of the outlets onto a front windshield.

2. The heated windshield wiper assembly of claim 1:
   wherein the heater-blower has a cylindrical outer wall continuously disposed between the top end and the bottom end;
   a pair of spaced apart grooves disposed circumferentially around the outer wall;
   each of the grooves configured to retain a tie band to mount the heater-blower an underside of a vehicle hood.

3. The heated windshield wiper assembly of claim 2 further comprising:
   an attachment body disposed on each blade housing proximal the front wall of the blade housing, the attachment body having an inner side and an outer side;
   a clip having a rearward end and a forward end, the reward end centrally attached to the casing front side and the forward end centrally attached to the attachment body inner side;
   wherein the arm of each front windshield wiper blade is attached to the attachment body outer side.

* * * * *